United States Patent
Ersbo et al.

(10) Patent No.: US 12,143,340 B2
(45) Date of Patent: Nov. 12, 2024

(54) TIMING ALIGNMENT FOR WIRELESS DEVICE TO WIRELESS DEVICE MEASUREMENTS

(71) Applicant: Telefonaktiebolaget LM Ericsson (publ), Stockholm (SE)

(72) Inventors: Petter Ersbo, Knivsta (SE); Jingya Li, Gothenburg (SE); Sebastian Faxér, Stockholm (SE); Naga Vishnu Kanth Irukulapati, Västra Frölunda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 351 days.

(21) Appl. No.: 17/430,166

(22) PCT Filed: Feb. 14, 2020

(86) PCT No.: PCT/EP2020/053860
§ 371 (c)(1),
(2) Date: Aug. 11, 2021

(87) PCT Pub. No.: WO2020/165396
PCT Pub. Date: Aug. 20, 2020

(65) Prior Publication Data
US 2023/0072049 A1 Mar. 9, 2023

Related U.S. Application Data

(60) Provisional application No. 62/806,601, filed on Feb. 15, 2019.

(51) Int. Cl.
*H04L 5/14* (2006.01)
(52) U.S. Cl.
CPC .................................. *H04L 5/14* (2013.01)

(58) Field of Classification Search
CPC ... H04L 5/14; H04L 5/00; H04L 27/26; H04L 25/02; H04L 1/00; H04L 25/0226;
(Continued)

(56) References Cited

U.S. PATENT DOCUMENTS 8,031,692 B2 * 10/2011 Jeong .................. H04B 7/2681
370/350
9,503,246 B2 * 11/2016 Bergström ........ H04W 56/0045
(Continued)

FOREIGN PATENT DOCUMENTS

| WO | 2018052355 A1 | 3/2018 |
| WO | 2018126792 A1 | 7/2018 |

OTHER PUBLICATIONS

Australian Examination Report No. 2 for Standard Patent Application dated Apr. 12, 2023 for Application No. 2020220451, consisting of 5 pages.
(Continued)

*Primary Examiner* — Man U Phan
(74) *Attorney, Agent, or Firm* — Weisberg I.P. Law, P.A.

(57) ABSTRACT

Methods, wireless devices (WD), and network nodes are disclosed. For example, there is disclosed a network node configured to communicate with a wireless device in a cell. The network node is further configured to, and/or includes a radio interface and/or includes processing circuitry configured to communicate a timing advance offset to the wireless device for adjusting the uplink transmission relative to the downlink reception in the cell. The timing offset is based on the timing offset used by another wireless device in another cell to adjust the timing of uplink transmission relative to the downlink reception timing. Furthermore, the cells are configured to operate using TDD configurations.

16 Claims, 13 Drawing Sheets

(58) Field of Classification Search
CPC ....... H04L 5/0051; H04J 11/00; H04W 72/12; H04W 72/08; H04W 72/54; H04W 72/20; H04W 52/24; H04W 88/04; H04W 24/10; H04W 24/08; H04W 52/04; H04W 16/10; H04B 17/33; H04B 17/34; H04B 1/04; H04B 1/71; H04B 7/06
USPC .......................................................... 370/280
See application file for complete search history.

(56) References Cited

U.S. PATENT DOCUMENTS

| | | | | |
|---|---|---|---|---|
| 9,629,014 | B2* | 4/2017 | Li | H04L 5/0048 |
| 9,860,914 | B2* | 1/2018 | Chen | H04W 72/23 |
| 11,201,719 | B2* | 12/2021 | Wu | H04J 11/005 |
| 11,202,218 | B2* | 12/2021 | Kim | H04L 1/0026 |
| 11,233,623 | B2* | 1/2022 | Xu | H04B 17/336 |
| 11,425,734 | B2* | 8/2022 | Yasukawa | H04L 5/0073 |
| 11,589,323 | B2* | 2/2023 | Zhang | H04L 27/26025 |
| 2006/0029031 | A1 | 2/2006 | Koorapaty | |
| 2012/0320806 | A1 | 12/2012 | Ji et al. | |
| 2015/0230268 | A1 | 8/2015 | Chen et al. | |
| 2016/0157216 | A1 | 6/2016 | Fwu et al. | |
| 2022/0103270 | A1* | 3/2022 | Miao | H04L 5/0048 |
| 2022/0103333 | A1* | 3/2022 | Ghozlan | H04W 88/08 |
| 2022/0116898 | A1* | 4/2022 | Ying | H04W 56/0015 |
| 2022/0158782 | A1* | 5/2022 | Qi | H04L 5/0073 |

OTHER PUBLICATIONS

International Search Report and Written Opinion dated Apr. 28, 2020 for International Application No. PCT/EP2020/053860 filed Feb. 14, 2020, consisting of 9-pages.

3GPP TS 36.211 V15.3.0; 3rd Generation Partnership Project; Technical Specification Group Radio Access Network; Evolved Universal Terrestrial Radio Access (E-UTRA); Physical channels and modulation (Release 15), Sep. 2018, consisting of 237-pages.

3GPP TS 38.211 V15.3.0; 3rd Generation Partnership Project; Technical Specification Group Radio Access Network; NR; Physical channels and modulation (Release 15), Sep. 2018, consisting of 96-pages.

3GPP TS 38.133 V15.3.0; 3rd Generation Partnership Project; Technical Specification Group Radio Access Network; NR; Requirements for support of radio resource management (Release 15), Sep. 2018, consisting of 136-pages.

Australian Examination Report No. 1 dated Apr. 16, 2024 for Application No. 2023204657, consisting of 6 pages.

Shen et al. "Dynamic Uplink-Downlink Configuration and Interference Management in TD-LTE" Technology Updates on LTE Adbanced; IEEE Communicaions Magazine; Nov. 2012, consisting of 9 pages.

* cited by examiner

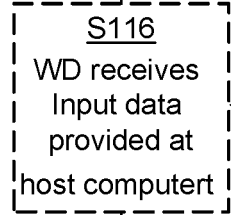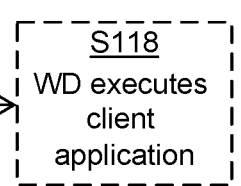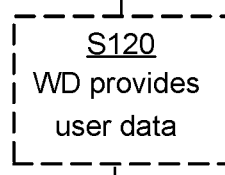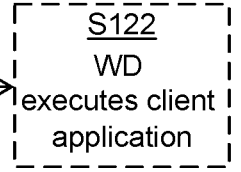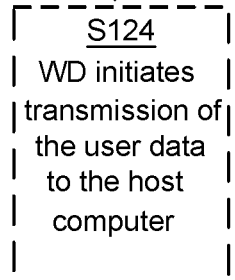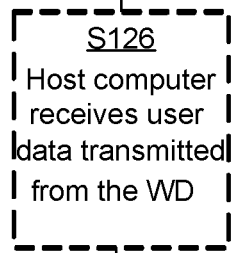
Fig. 10
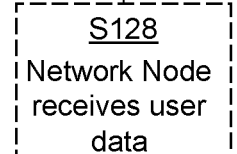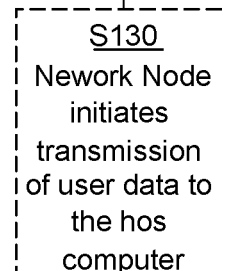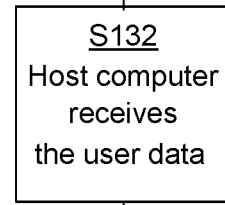
Fig. 11

Communicating (S134) a timing offset to the wireless device for adjusting the uplink transmission relative to the downlink reception in the cell, wherein the timing offset is based on the timing offset used by the another wireless device in the another cell to adjust the timing of uplink transmission relative to the downlink reception timing. — 134

Fig. 12

TIMING ALIGNMENT FOR WIRELESS DEVICE TO WIRELESS DEVICE MEASUREMENTS

FIELD

The present disclosure relates to wireless communications, and in particular, to a timing offset value relative to downlink reception timing of a wireless device for performing at least one measurement.

BACKGROUND

Interference Protection in Time Division Duplex (TDD) Networks

Wireless cellular networks are constructed of cells where each cell may be defined by a certain coverage area of a network node. The network node wirelessly communicates with wireless devices in the network. The communication is carried out in either paired or unpaired spectrum. For paired spectrum, the downlink (DL) and uplink (UL) directions are separated in frequency, called Frequency Division Duplex (FDD). In the case of unpaired spectrum, the DL and UL use the same spectrum, called Time Division Duplex (TDD).

As the name implies, the DL and UL are separated in the time domain, typically with a guard period (GP) between them. A GP may serve several purposes. For example, respective processing circuitry at the network node and at the wireless device may need sufficient time to switch between transmission and reception. However, this switching is typically a fast procedure and does not significantly contribute to the GP size. There is one GP at a DL-to-UL switch and one GP at an UL-to-DL switch, but since the GP at the UL-to-DL switch may only need to provide enough time to allow the network node and the wireless device to switch between reception and transmission, but this time is typically is small, and is therefore omitted and/or not considered the following description, for simplicity.

The GP at the DL-to-UL switch, however, may have to be set sufficiently large as to allow a wireless device to: receive a (time-delayed) DL grant that schedules the UL and transmit the UL signal with proper timing advance (compensating for the propagation delay) such that it is received in the UL part of the frame at the network node. The GP at the UL-to-DL switch is may be created with an offset to the timing advance. Thus, the GP may be set to larger than two times the propagation time towards a wireless device at the cell edge, otherwise, the UL and DL signals in the cell may interfere. Because of this, the GP is typically set or selected to depend on the cell size such that larger cells (i.e., larger inter-site distances) have a larger GP and vice versa.

Also, the GP reduces DL-to-UL interference between network nodes by allowing a certain propagation delay between cells without having the DL transmission of a first network node enter the UL reception of a second network node. In a typical macro network, the DL transmission power can be on the order of 20 dB larger than the UL transmission power, and the pathloss between network nodes, perhaps above roof top and in line of sight (LOS), may often be much smaller than the pathloss between network nodes and wireless device (in non-LOS). Hence, if the UL is interfered with by the DL of other cells, which is referred to as cross-link interference (CLI), the UL performance can become degraded, in some cases, severely degraded. Because of the large transmit power discrepancy between UL and DL (i.e., DL from network node is typically larger than UL from wireless devices) and/or propagation conditions, CLI may hinder system performance not only for the co-channel case (where the DL interferes the UL on the same carrier) but also for the adjacent channel case (where the DL of one carrier interferes with UL on an adjacent carrier). Because of these characteristics, TDD macro networks are typically operated in a synchronized and aligned fashion where the symbol timing is aligned and a semi-static TDD UL/DL pattern is used which may be the same for all the cells in the network. By aligning UL and DL periods so that they do not occur simultaneously, interference between UL and DL may be reduced. Typically, network operators with adjacent TDD carriers also synchronize their TDD UL/DL patterns to avoid adjacent CLI.

The principle of applying a GP, at the DL-to-UL switch, to avoid DL-to-UL interference between network nodes is shown in FIG. 1 where a victim network node (V) is being (at least potentially) interfered with by an aggressor network node (A). In particular, the aggressor network node sends a DL signal to a wireless device in its cell where the DL signal also reaches the victim network node as the propagation loss is not enough to protect the victim network node from the signals of the aggressor network node where the victim network node is trying to receive a signal from another wireless device (not shown in FIG. 1) in its cell. The signal has propagated a distance (d) and due to propagation delay where the experienced frame structure alignment of aggressor network node at the victim network node is shifted/delayed t second, proportional to the propagation distance d. As illustrated in FIG. 1, although the DL part of the aggressor network node (A) is delayed, the DL part does not enter the UL region of the victim network node (V) due to the GP being used. As a side note, the aggressor network node's DL signal does undergo attenuation, but may, due to differences in transmit powers in wireless devices and network nodes as well as propagation condition differences for network node-to-network node links and wireless device-to-network node links, be very high relative to the received victim UL signal.

The terms victim and aggressor are used here to illustrate why typical TDD systems are designed in a certain manner. The victim network node can also act as an aggressor network node and vice versa, and even simultaneously, since channel reciprocity exists between the network nodes.

NR Frame Structure

The radio access technology (RAT) next generation mobile wireless communication system (5G) (also referred to as New Radio (NR)), supports a diverse set of use cases and a diverse set of deployment scenarios. The later includes deployment at both low frequencies (100s of MHz), similar to the RAT LTE in existing system, and very high frequencies (mm waves in the tens of GHz).

Similar to LTE, NR uses OFDM (Orthogonal Frequency Division Multiplexing) in the DL (i.e., from a network node to a wireless device). The basic NR physical resource over an antenna port can thus correspond to a time-frequency grid as illustrated in FIG. 2, where a resource block (RB) in a 14-symbol slot is shown. A RB corresponds to 12 contiguous subcarriers in the frequency domain. RBs are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times2^{\alpha})$ kHz where $\alpha \in (0,1,2,3,4)$. $\Delta f=15$ kHz is the basic (or reference) sub-carrier spacing that is also used in LTE.

In the time domain, DL and UL transmissions in NR may be organized into equally-sized subframes of 1 ms each, similar to LTE. A subframe is further divided into multiple slots of equal duration. The slot length for subcarrier spacing $\Delta f=(15 \times 2^\alpha)$ kHz is $\frac{1}{2}^\alpha$ ms. There is only one slot per subframe at $\Delta f=15$ kHz and a slot consists of 14 OFDM symbols.

DL transmissions are dynamically scheduled, i.e., in each slot the network node transmits DL control information (DCI) about which wireless device data is to be transmitted to and which RB s, in the current DL slot, the data is to be transmitted on. This control information is typically transmitted in the first one or two OFDM symbols in each slot in NR. The control information is carried on the Physical Downlink Control Channel (PDCCH) and data is carried on the Physical Downlink Shared Channel (PDSCH). A wireless device first detects and decodes PDCCH and if a PDCCH is decoded successfully, the wireless device then decodes the corresponding PDSCH based on the decoded control information in the PDCCH. In addition to PDCCH and PDSCH, there are also other channels and reference signals (RSs) transmitted in the DL.

UL data transmissions, carried on Physical Uplink Shared Channel (PUSCH), are also dynamically scheduled by the network node by transmitting a DCI. In case of TDD operation, the DCI (which is transmitted in the DL region) always indicates a scheduling offset so that the PUSCH is transmitted in a slot in the UL region.

Uplink-Downlink Configurations in TDD

In TDD, some subframes/slots are allocated for UL transmissions and some subframes/slots are allocated for DL transmissions. The switch between DL and UL occurs in the special subframes (LTE) or flexible slots (NR).

LTE TDD Configuration

In the Third Generation Partnership Project (3GPP) Technical Specification (TS) 36.211, three radio frame structures are supported. Frame structure type 1 (FS 1) may be applicable to FDD only, frame structure type 2 (FS 2) may be applicable to TDD only, and frame structure type 3 (FS 3) may be applicable to licensed assisted access (LAA) secondary cell operation only.

With FS 2 for TDD, each radio frame of length 10 ms consists of two half-frames of length 5 ms each. Each half-frame consists of five subframes (SFs) of length 1 ms. Each subframe (SF) is defined by two slots of length 0.5 ms each. Within each radio frame, a subset of SFs are reserved for UL transmissions, and the remaining SFs are allocated for DL transmissions, or for special SFs, where the switch between DL and UL occurs.

As shown in Table 1 (below), seven different DL/UL configurations are supported for FS 2. Here, "D" denotes a DL SF, "U" denotes an UL SF, and "S" represents a special SF. Configurations 0, 1, 2, and 6 have 5 ms DL-to-UL switch-point periodicity and the special SF exists in both SF 1 and SF 6. Configurations 3, 4 and 5 have 10 ms DL-to-UL switch-point periodicity and the special SF in SF 1 only.

TABLE 1

LTE UL-DL configurations (3GPP TS 36.211, Table 4.2-2)

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a DL part (DwPTS), GP and an UL part (UpPTS). In 3GPP TS 36.211, a set of DwPTS/GP/UpPTS configurations is supported, as illustrated in Table 2 (below), where X denotes the number of symbols that can be additionally configured for SRS enhancement. The DwPTS with a duration more than 3 symbols can be treated as a normal DL SF for data transmission. However, the UpPTS may not be used for data transmission due to its very short duration for special SF configurations 0-9. Instead, the UpPTS for these configurations can be used for channel sounding or random access. In LTE release 14, special SF configuration 10 was introduced for uplink coverage enhancement, and the UpPTS of this configuration can be used for uplink data transmission.

TABLE 2

Special SF configurations (lengths of DwPTS/GP/UpPTS in symbols)

| Special SF configuration | Normal CP for DL and UL | | | Extended CP for DL and UL | | |
|---|---|---|---|---|---|---|
| | DwPTS | GP | UpPTS | DwPTS | GP | UpPTS |
| 0 | 3 | 10 - X | 1 + X | 3 | 8 - X | 1 + X |
| 1 | 9 | 4 - X | 1 + X | 9 | 2 - X | 1 + X |
| 2 | 10 | 3 - X | 1 + X | 10 | 1 - X | 1 + X |
| 3 | 11 | 2 - X | 1 + X | 11 | 0 - X | 1 + X |
| 4 | 12 | 1 - X | 1 + X | 3 | 7 - X | 2 + X |
| 5 | 3 | 9 - X | 2 + X | 9 | 1 - X | 2 + X |
| 6 | 9 | 3 - X | 2 + X | 10 | 0 - X | 2 + X |
| 7 | 10 | 2 - X | 2 + X | 5 | 5 - X | 2 + X |
| 8 | 11 | 1 - X | 2 + X | | | |
| 9 | 6 | 6 - X | 2 + X | | | |
| 10 | 6 | 2 | 6 | | | |

Typically, the DL/UL configuration and the configuration of the special SF used in a cell are signaled as part of the system information, which is included in system-information block 1 (SIB1) and broadcasted every 80 ms within SF 5.

To better handle the high traffic dynamics in a local-area scenario, the enhanced Interference Mitigation and Traffic Adaptation (eIMTA) feature was introduced in LTE 3GPP Rel-12 to allow for dynamic and flexible configuration of TDD UL/DL resources. More specifically, a wireless device can be configured by higher layers to monitor PDCCHs with cyclic redundancy check (CRC) scrambled by eIMTA-RNTI. By detecting the DCI carried on the PDCCHs (i.e., DCI format 1C), the wireless device knows the reconfigured TDD UL/DL configurations for one or more serving cell(s). The reconfigured TDD UL/DL configuration for each serving cell is selected from the 7 configurations defined in Table 1 and signaled by the corresponding 3-bit UL/DL configuration index filed in the DCI. Table 3 (below) illustrates the eIMTA based flexible TDD frame structure, where "F" denotes a flexible SF, which can be configured either to UL or DL, depending on which TDD UL/DL configuration is selected.

TABLE 1 eIMTA based flexible TDD Subframe number

| 0 | 1 | 2 | 3 | 4 | 5 | 6 | 7 | 8 | 9 |
|---|---|---|---|---|---|---|---|---|---|
| D | S | U | F | F | D | D or S | F | F | F |

The TDD UL/DL reconfiguration can be operated on a radio frame basis, and the reconfiguration can be applied for a few radio frames configured by higher layer parameters.

NR TDD Configuration

Similar to LTE, NR supports semi-static TDD UL/DL configurations by cell-specific RRC (Radio Resource Control) signaling (TDD-UL-DL-ConfigurationCommon in SIB1). In contrast to LTE, up to two concatenated TDD DL-UL patterns can be configured in NR. Each TDD DL-UL pattern is defined by a number of consecutive full DL slots at the beginning of the TDD pattern (nrofDownlinkSlots), a number of consecutive DL symbols in the slot following the full DL slots (nrofDownlinkSymbols), a number of symbols between DL and UL segments (GP, or flexible symbols), a number of UL symbols in the end of the slot preceding the first full UL slot (nrofUplinkSymbols), and a number of consecutive full UL slots at the end of the TDD pattern (nrofUplinkSlots). The periodicity of a TDD DL-UL pattern (di-UL-TransmissionPeriodicity) can be configured ranging from 0.5 ms to 10 ms.

Besides the cell-specific TDD UL/DL configuration via TDD-UL-DL-ConfigurationCommon, a wireless device can be additionally configured by a wireless device-specific RRC signaling (TDD-UL-DL-ConfigDedicated) to override only the flexible symbols provided in the cell-specific semi-static TDD configuration.

In addition, NR supports dynamic TDD, that is, dynamical signalling of the DL, flexible, and UL allocation on symbol level for one or multiple slots to a group of wireless devices by using a Slot Format Indicator (SFI) in the DCI carried on a group-common PDCCH (DCI Format 2_0). The SFI filed in a DCI format 2_0 indicates to a group of wireless devices a slot format for each slot in a number of slots starting from a slot where the DCI format 2_0 is detected.

A slot format is identified by a corresponding format index as provided in Table 4, where 'D' denotes a downlink symbol, 'U' denotes an uplink symbol, and 'F' denotes a flexible symbol.

TABLE 4

Slot formats for normal cyclic prefix (3GPP TS 38.213, Table 11.1.1-1)

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |

TABLE 4-continued

Slot formats for normal cyclic prefix (3GPP TS 38.213, Table 11.1.1-1)

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | F | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | Wireless device determines the slot format for the slot based on TDD-UL-DL-ConfigurationCommon, or TDD-UL-DL-ConfigDedicated and, if any, on detected DCI formats | | | | | | | | | | | | | |

The dynamic SFI cannot override the DL and UL transmission directions that are semi-statically configured via the cell-specific RRC signalling, neither can the dynamic SFI override a dynamically scheduled DL or UL transmission. However, the SFI can override a symbol period semi-statically indicated as flexible by restricting it to be DL or UL. In addition, the SFI can be used to provide a reserved resource, that is, if both the SFI and the semi-static signalling indicate a certain symbol to be flexible, then, the symbol should be treated as reserved and not be used for transmission.

The support for dynamic TDD enables NR to help maximize the utilization of available radio resources in an efficient manner for both traffic directions. Although dynamic TDD brings significant performance gain at low to medium loads, the performance benefits become smaller as the traffic load increases due to the CLI. As shown in FIG. 3, if two cells have different traffic directions, wireless device 1 (WD1) in the DL experiences very strong interference from wireless device 2 (WD 2) which can be closer than the serving network node 1 (NN1). From network node 2 (NN2) in UL perspective, NN2 may also experience interference from network node 1 since network node 1 is transmitting on the DL. CLI may be a main impediment to performance gains from dynamic TDD operation at higher loads as compared to static TDD. Most existing solutions try to minimize the CLI by defining signaling between network nodes in order to exchange information regarding the sources and the levels of interference in the operator network.

The situation can also be illustrated at the symbol level where the different network nodes use different transmission directions in different symbols, as illustrated in FIG. 4, assuming that in a given slot, the format index 48 is configured for the wireless devices in network node 1 and the format index 49 is configured for the wireless devices in network node 2. The situation shown in FIG. 3 may occur in symbol index 2, 3, 9 and 10 in FIG. 4.

CLI Measurements

To assist the network operator in gaining information about the pathloss between network nodes and wireless devices, CLI measurements can be adopted. These measurements can be based on, for example, the total received signal, e.g., RSSI (Received Signal Strength Indicator), or the received signal strength from a specific (set of) transmitting network nodes/wireless devices, e.g., RSRP (Received Signal Reference Power).

In Radio Access Network 1 (RAN1) AH 1901 meeting, a discussion was had that the following UE-to-UE CLI measurements should be supported:

SRS-RSRP:
  Linear average of the power contributions of the SRS to be measured over the configured resource elements within the considered measurement frequency bandwidth in the time resources in the configured measurement occasions.

RSSI:
  The linear average of the total received power observed only in certain OFDM symbols of measurement time resource(s), in the measurement bandwidth, over the configured resource elements for measurement by the wireless device.

Timing Advance

Due to the propagation delay $T_d$ between a wireless device and its respective serving network node, the downlink reception timing for each wireless device may have an offset of $T_d$ relative to its serving network nodes downlink transmission timing. To compensate for this, the wireless device may apply a timing advance of $T_{TA} \approx 2T_d + N_{TA,offset}T_c$ with respect to its downlink reception timing when performing uplink transmissions, where $N_{TA,offset}T_c$ is the fixed offset between the UL reception timing and the DL transmission timing at a network node, here, $T_c$ is the basic timing unit defined in 3GPP TS 38.211 and $N_{TA,offset}$ the timing advance offset (in number of $T_c$) is defined, for example, in 3GPP TS 38.133 ($\approx$20.3 μs for FR1 without LTE-NR coexistence and $\approx$10.9 μs for FR2). The timing advance, $T_{TA}$, is used to account for TX/RX switching processing time. This timing advance is used to align the timing between the received uplink signals from different wireless devices at the serving network node.

As shown in FIG. 5, the propagation distance between an aggressor wireless device (WD 1) and a victim wireless device (WD 2) is likely different from the propagation distance between the victim wireless device (WD 2) and its serving network node (the network node in Cell 2) and/or the propagation distance between the aggressor wireless device (WD 1) and its serving network node (the network node in Cell1). Therefore, when a victim wireless device measures the SRS transmitted from an aggressor wireless device (referred to as CLI-SRS), its reception timing for detecting the CLI-SRS may need to be adjusted by a timing offset relative to its own DL reception timing for receiving the regular DL transmissions from its serving network node. However, such an adjustment is not considered in existing systems.

SUMMARY

Some embodiments advantageously provide methods, systems, and apparatuses for a timing offset value relative to downlink reception timing of a wireless device for performing at least one measurement.

In one aspect a network node is provided. The network node configured to communicate with a wireless device in a cell. The network node is further configured to, and/or comprising a radio interface and/or comprising processing circuitry configured to communicate a timing advance offset to the wireless device for adjusting the uplink transmission relative to the downlink reception in the cell. The timing offset is based on the timing offset used by another wireless device in another cell to adjust the timing of uplink transmission relative to the downlink reception timing. Furthermore, the cells are configured to operate using TDD configurations.

In another aspect a method for a network node is provided. The method is implemented in a network node and the network node being connected to a wireless device in a cell, where the cell experience cross-link interference from another cell comprising another network node and another wireless device configured to implement a downlink reception timing adjustment to the uplink transmission. The cells operate using TDD configurations. The method includes communicating a timing offset to the wireless device for adjusting the uplink transmission relative to the downlink reception in the cell, where the timing offset is based on the timing offset used by the another wireless device in the another cell to adjust the timing of uplink transmission relative to the downlink reception timing.

In another aspect a wireless device is provided. The wireless device is configured to implement a downlink reception timing adjustment to the uplink transmission relative to the downlink reception. Further, the wireless device being connectable to a network node in a cell, Furthermore, the wireless device is configured to, and/or comprising a radio interface and/or processing circuitry configured to receive a timing offset from the network node, and to apply a timing offset to the uplink transmission relative to the downlink reception timing, in the cell, when performing at least one Cross-Link Interference, CLI, measurement. The timing offset is based on the timing offset useable by another wireless device in another cell to adjust the timing of uplink transmission relative to the downlink reception timing. The cells are configured to operate using TDD configurations.

In another aspect a method implemented in a wireless device is provided. The wireless device configured to implement a timing adjustment to the uplink transmission relative to the downlink reception. The wireless device being connected to a network node in a cell, where the cell experience cross-link interference from another cell comprising another network node and another wireless device configured to implement a downlink reception timing adjustment to the uplink transmission. The cells operate using TDD configurations. The method includes receiving a timing offset value from the network node, and applying a timing offset to the uplink transmission relative to the downlink reception timing, in the cell, when performing at least one Cross-Link Interference, CLI, measurement, where the timing offset is based on the timing offset used by the another wireless device in the another cell to adjust the timing of uplink transmission relative to the downlink reception timing.

A number of examples of methods for determining and configuring the timing offset of CLI-SRS reception relative to a wireless device's DL reception timing are disclosed and discussed herein.

Method 1: The timing offset is fixed to $\Delta_T = N_{TA,offset} T_c$

Method 2: The timing offset is the timing advance used for the wireless device's own uplink transmission, i.e., $\Delta_T = T_{TA} \approx 2T_d + N_{TA,offset} T_c$, where $T_d$ is the propagation delay between the wireless device and its serving network node. That is, the timing for receiving CLI-SRS, it the same as its own uplink transmission timing.

Method 3: The timing offset is fixed to $\Delta_T \approx 2T + N_{TA,offset} T_c$, where $T = d/c$, and d is the cell radius and c is the speed of light.

Method 4: The timing offset is fixed to $\Delta_T = T_d + N_{TA,offset} T_c$, where $T_d$ is the propagation delay between the wireless device and its serving network node.

Method 5: The timing offset is deployment dependent. For example, the timing offset is one of the fixed values proposed in the above Methods, depending on the CLI scenarios, or cell sizes, etc.

Method 6: The timing offset is the sum of a fixed and a configurable part, $\Delta_T = \Delta_T^{Conf} + N_{TA,offset} T_c$ where $\Delta_T^{Conf}$ is configured to the wireless device by the network node.

The solutions described herein may improve the SRS-RSRP based CLI measurement accuracy as compared with other solutions.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a flowchart illustrating exemplary methods implemented in a communication system including a host computer, a network node and a wireless device for receiving user data from the wireless device at a host computer according to some embodiments of the present disclosure;

FIG. 11 is a flowchart illustrating exemplary methods implemented in a communication system including a host computer, a network node and a wireless device for receiving user data at a host computer according to some embodiments of the present disclosure;

FIG. 12 is a flowchart of an exemplary process in a network node according to some embodiments of the present disclosure;

DETAILED DESCRIPTION

Figure 1:
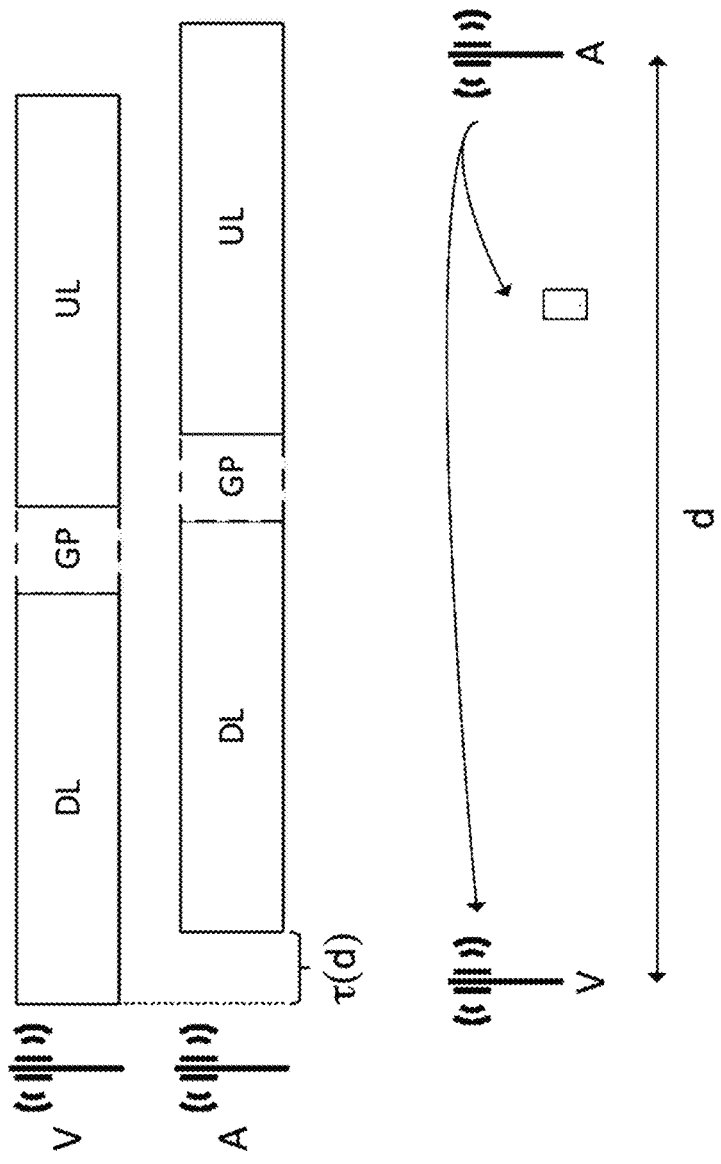
FIG. 1 is a diagram of a TDD GP design.
Figure 2:
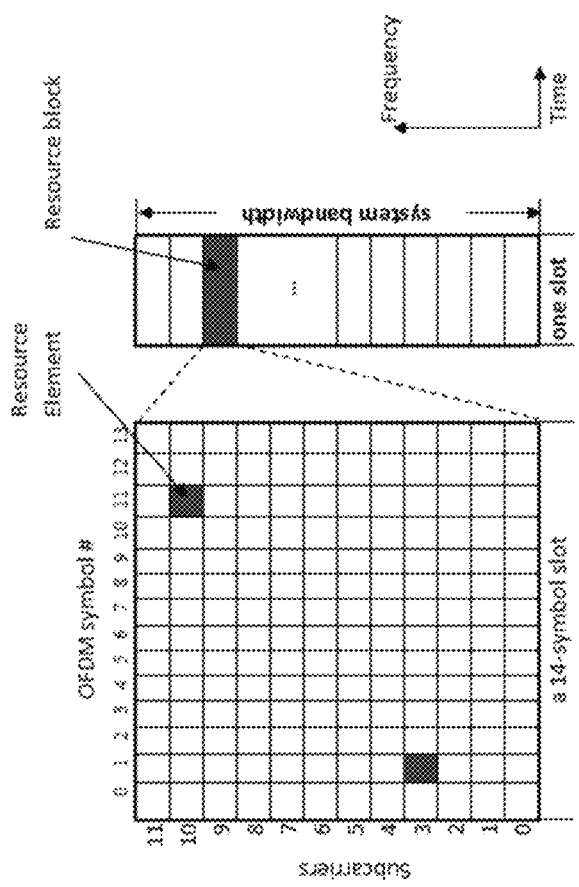
FIG. 2 is a diagram of a NR physical resource grid.
Figure 3:
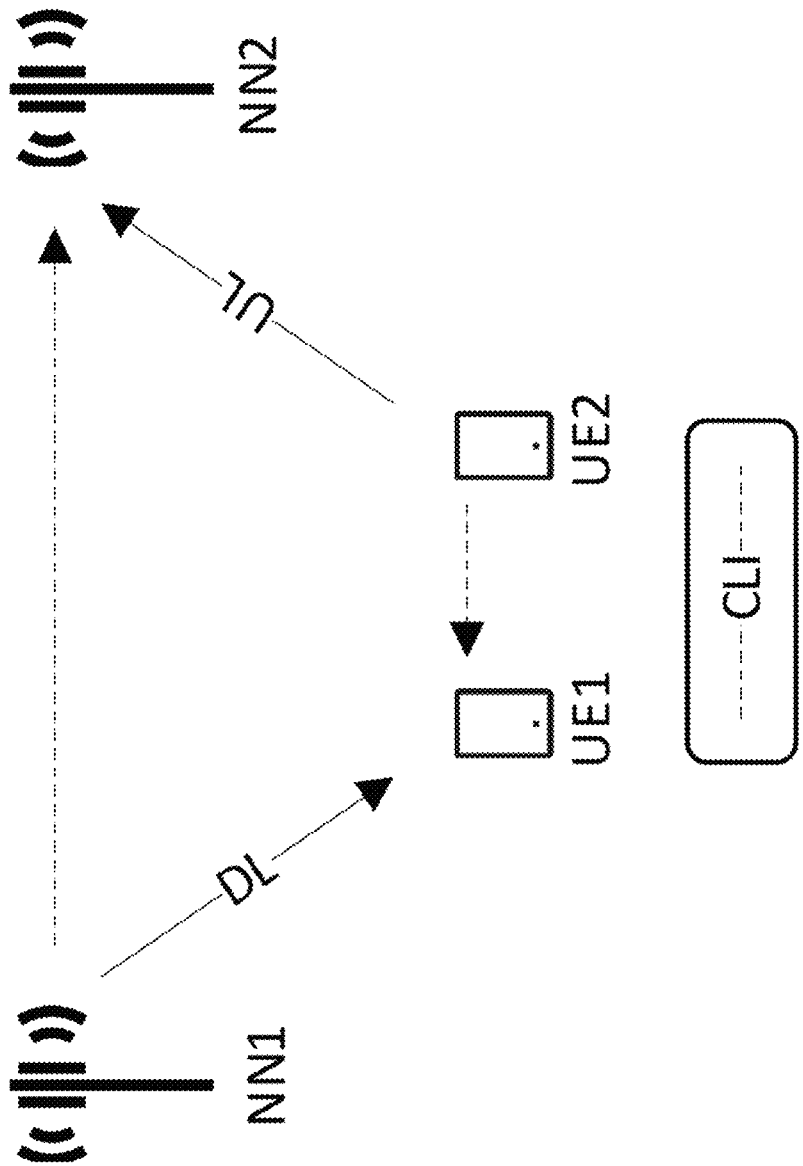
FIG. 3 is a diagram of a CLI issue in dynamic TDD.
Figure 4:
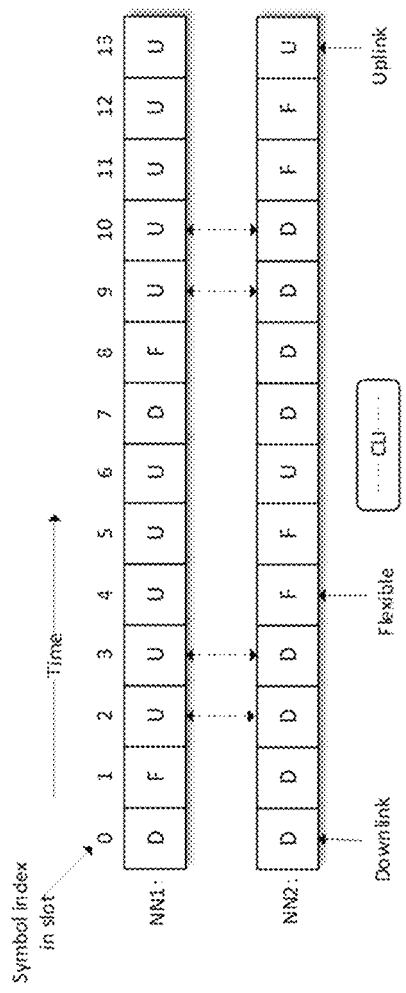
FIG. 4 is a diagram of a CLI issue in a NR dynamic TDD in a slot.

As described above, adjustment of reception timing for detecting the CLI-SRS is not considered in existing systems. This adjustment to the timing offset is addressed herein in order to help make sure that the SRS-RSRP measurements accuracy is enough to be useful for CLI handling.

Before describing in detail exemplary embodiments, it is noted that the embodiments reside primarily in combinations of apparatus components and processing steps related to a timing offset value relative to downlink reception timing of a wireless device for performing at least one measurement. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB, MeNB, SeNB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, relay node, IAB node, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

An uplink can be generalized to correspond to UL in the access link, and UL in the wireless backhaul link. Similarly, a downlink can be generalized to correspond to DL in the access link, and DL in the wireless backhaul link. Further, transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

The term radio access technology (RAT), may refer to any RAT, e.g., UTRA, E-UTRA, narrow band internet of things (NB-IoT), WiFi, Bluetooth, next generation RAT (NR), 4G, 5G, etc. Any of the first and the second nodes may support a single or multiple RATs.

The term signal used herein can be any physical signal or physical channel. Examples of downlink physical signals are RSs such as PSS, SSS, CRS, PRS, CSI-RS, DMRS, NRS, NPSS, NSSS, SS, MBSFN RS etc. Examples of uplink physical signals are RSs such as SRS, DMRS etc. The term physical channel (e.g., in the context of channel reception) used herein is also called as 'channel. The physical channel carries higher layer information (e.g. RRC, logical control channel, etc.)

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A cell may be generally a communication cell, e.g., of a cellular or mobile communication network, provided by a node. A serving cell may be a cell on or via which a network node (the node providing or associated to the cell, e.g., base station, gNB, eNodeB, etc.) transmits and/or may transmit data (which may be data other than broadcast data) to a wireless device, in particular control and/or user or payload data, and/or via or on which a wireless device transmits and/or may transmit data to the node, a serving cell may be a cell for or on which the wireless device is configured and/or to which it is synchronized and/or has performed an access procedure, e.g., a random access procedure, and/or in relation to which it is in a RRC_connected or RRC_idle state, e.g., in case the node and/or wireless device and/or network follow the LTE-standard. One or more carriers (e.g., uplink and/or downlink carrier/s and/or a carrier for both uplink and downlink) may be associated to a cell.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide a timing offset value relative to downlink reception timing of a wireless device for performing at least one measurement.

Figure 6:
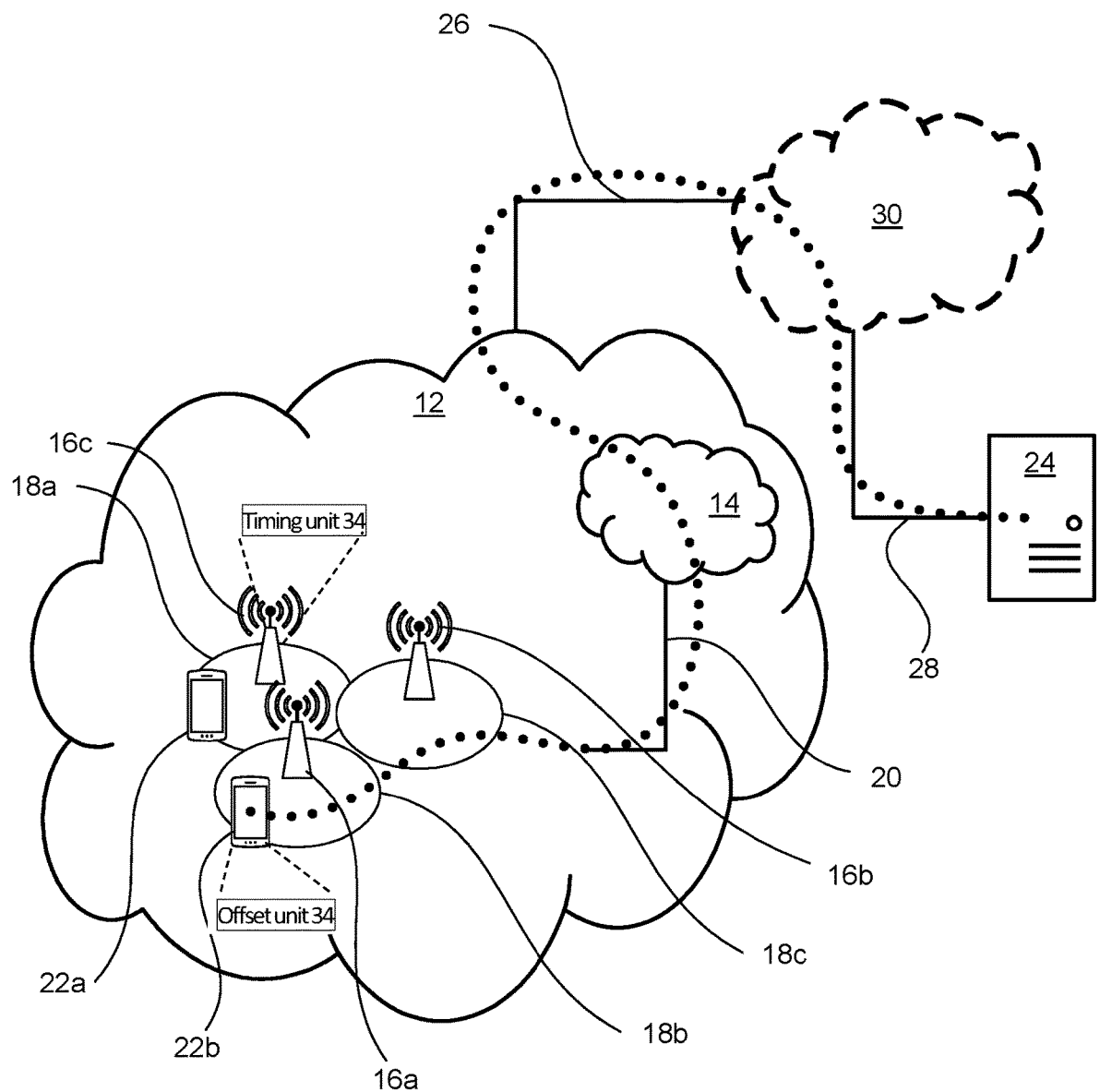
FIG. 6 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a timing unit 32 which is configured to perform one or more network node 16 functions that are described herein such as communicating a timing advance to the wireless device. A wireless device 22 is configured to include an offset unit 34 which is configured to perform one or more wireless device 22 functions as described herein such as applying a timing offset value.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, determine, transmit, receive, forward, etc., information related to a timing offset value.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include timing unit 32 configured to perform one or more network node 26 functions that are described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an offset unit 34 configured to perform one or more wireless device 22 functions described herein.

Figure 7:
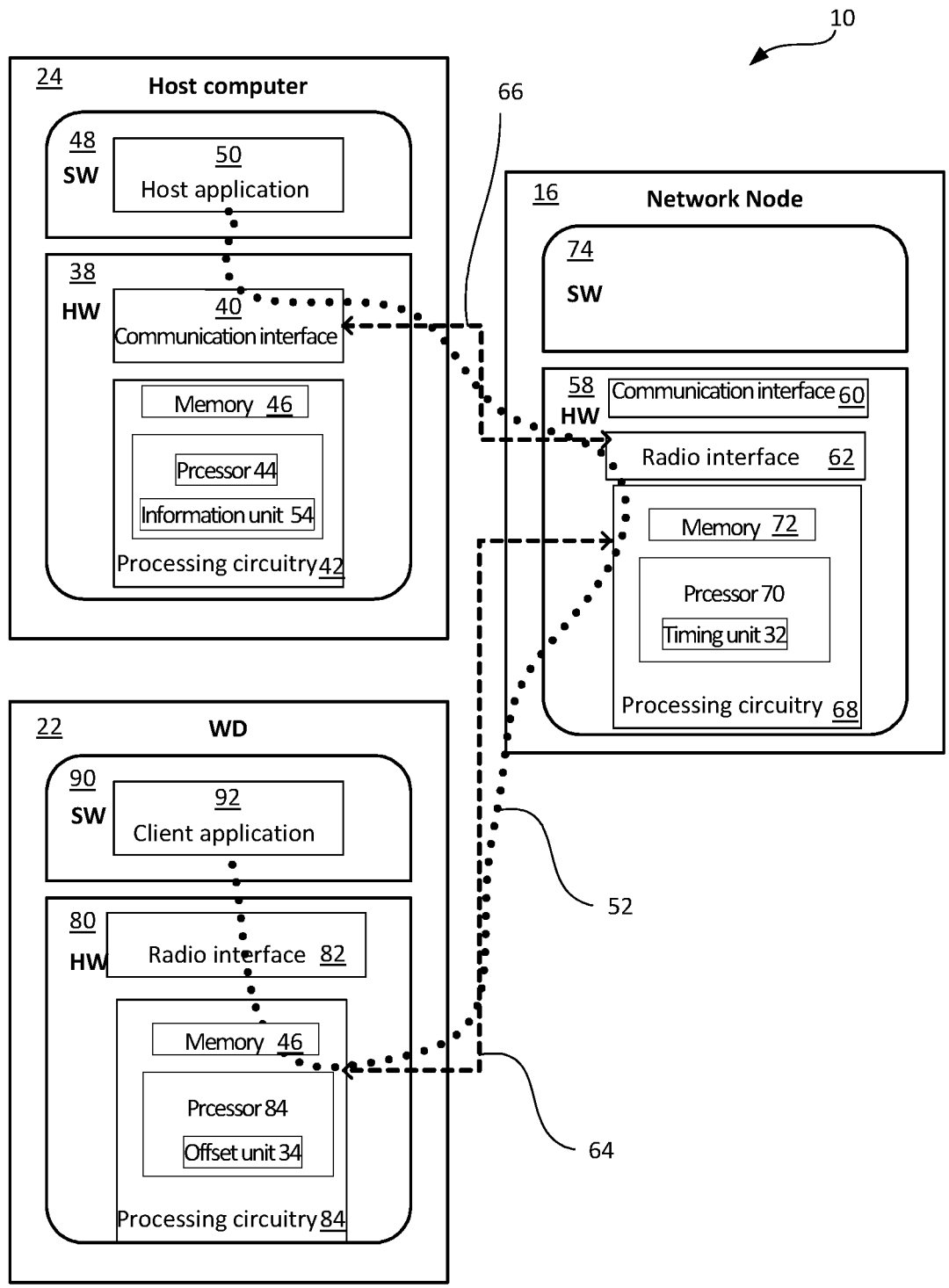
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as timing unit 32, and offset unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 8, 9:
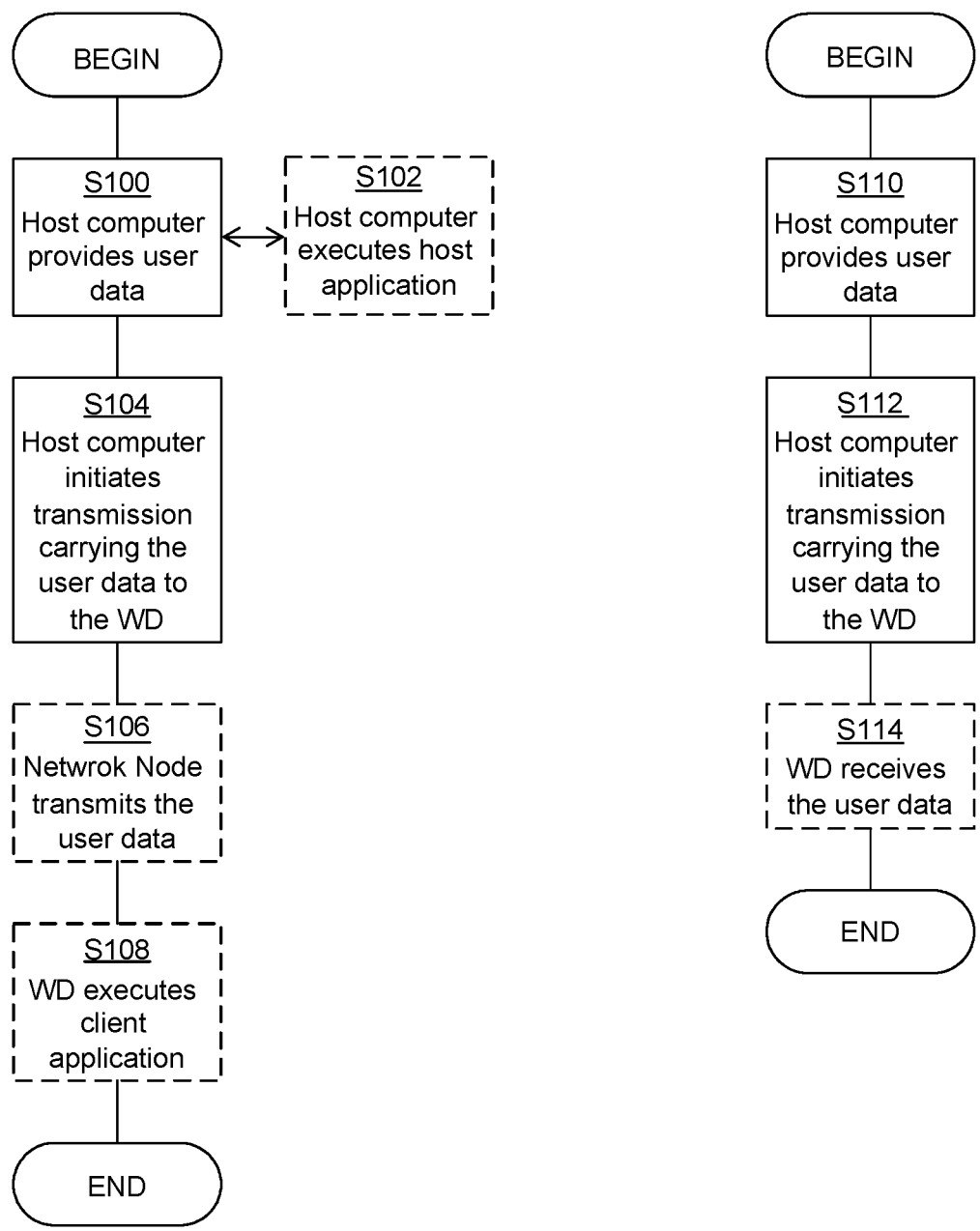
FIG. 8 is a flowchart illustrating exemplary methods implemented in a communication system including a host computer, a network node and a wireless device for executing a client application at a wireless device according to some embodiments of the present disclosure.
FIG. 9 is a flowchart illustrating exemplary methods implemented in a communication system including a host computer, a network node and a wireless device for receiving user data at a wireless device according to some embodiments of the present disclosure.

FIG. 8 is a flowchart illustrating an exemplary method implemented in a communication system, such as, for example, the communication system of FIGS. 6 and 7, in accordance with one embodiment. The communication system may include a host computer 24, a network node 16 and a WD 22, which may be those described with reference to FIG. 7. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 9 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 10 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 11 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 12 is a flowchart of an exemplary process in a network node 16 according to some embodiments of the disclosure. One or more Blocks and/or functions performed by network node 16 may be performed by one or more elements of network node 16 such as by assignment unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to communicate (Block S134) a timing offset to the wireless device for adjusting the uplink transmission relative to the downlink reception in the cell. The timing offset is based on the timing offset used by the another wireless device in the another cell to adjust the timing of uplink transmission relative to the downlink reception timing. For example, referring to FIG. 5 the timing offset communicated by the victim UE (UE2) is based on the timing offset used by the aggressor UE (UE1).

Figure 13:
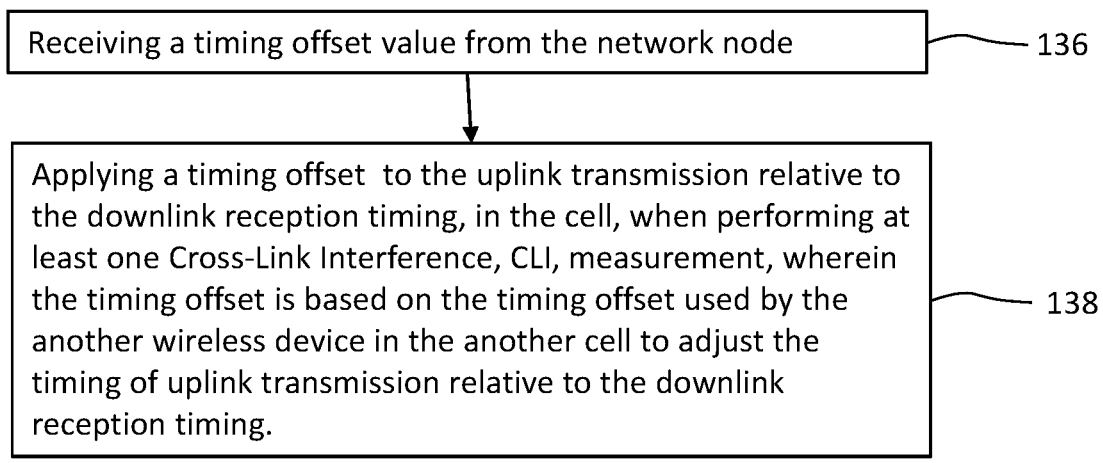
FIG. 13 is a flowchart of an exemplary process in a wireless device according to some embodiments of the present disclosure.

According to one or more embodiments, the at least one measurement is a Sounding Reference Signal-Reference Signal Received Power, SRS-RSRP, based Cross-Link Interference, CLI, measurement. According to one or more embodiments, the timing offset value of the wireless device is based on at least one of: a fixed offset between uplink reception timing and downlink transmission timing at the network node, a propagation delay between the wireless device and the network node, a cell radius of the network node, and a timing advance According to another embodiment the timing offset is applied to the uplink transmission relative to the downlink reception timing, in the cell, when performing at least one Cross-Link Interference, CLI, measurement at least one CLI measurement is based on a Sounding Reference Signal-Reference Signal Received Power, SRS-RSRP measurement or on a Received Signal Strength Indicator, RSSI, based measurement.is a Received Signal Strength Indicator, RSSI, based measurement. The signal used for the CLI measurement is transmitted from the another wireless device FIG. 13 is a flowchart of an exemplary process in a wireless device 22, 22b, UE 1 according to some embodiments of the present disclosure. One or more Blocks and/or functions performed by wireless device 22 may be performed by one or more elements of wireless device 22 such as by determination unit 34 in processing circuitry 84, processor 86, radio interface 82, etc. In one or more embodiments, wireless device 22 such as via one or more of processing circuitry 84, processor 86 and radio interface 82 is configured to receive (Block 136) a timing offset value from the network node (16, 16a) and applying (Block 138) a timing offset to the uplink transmission relative to the downlink reception timing, in the cell (18b), when performing at least one Cross-Link Interference, CLI, measurement. The timing offset is based on the timing offset used by the another wireless device (WD 22a, UE 2) in the another cell (18a) to adjust the timing of uplink transmission relative to the downlink reception timing.

According to one or more embodiments, wherein the at least one measurement is a Sounding Reference Signal-Reference Signal Received Power, SRS-RSRP, based Cross-Link Interference, CLI, measurement. According to one or more embodiments, the timing offset value is based on at least one of: a fixed offset between uplink reception timing and downlink transmission timing at the network node, a propagation delay between the wireless device and the network node, a cell radius of the network node, and a timing advance.

According to another embodiment the timing offset is applied to the uplink transmission relative to the downlink reception timing, in the cell, when performing at least one Cross-Link Interference, CLI, measurement at least one CLI measurement is based on a Sounding Reference Signal-Reference Signal Received Power, SRS-RSRP measurement or on a Received Signal Strength Indicator, RSSI, based measurement.is a Received Signal Strength Indicator, RSSI, based measurement. The signal used for the CLI measurement is transmitted from the another wireless device Having generally described arrangements and/or embodiments for a timing offset value relative to downlink reception timing of a wireless device for performing at least one measurement, details for these arrangements, functions and processes are provided as follows, and which may be implemented by the network node 16, wireless device 22 and/or host computer 24.

One or more embodiments described herein are directed to a wireless device 22 applying, such a via processing circuitry 84, a timing offset value relative to its own DL reception timing when or if performing SRS-RSRP measurements. Different methods, described herein, can be used to define and/or set the timing offset, as described below. In particular, one or more functions, described below, performed by the wireless device 22 may be performed by one or more of processing circuitry 84, radio interface 82, processor 86, and another component of wireless device 22. In particular, one or more functions, described below, performed by the network node 16 may be performed by one or more of processing circuitry 68, radio interface 62, processor 70, and another component of network node 16.

Method 1: The timing offset is fixed to $\Delta_T = N_{TA,offset}T_c$

Method 2: The timing offset is the timing advance used for the wireless device's own uplink transmission, i.e., $\Delta_T = T_{TA} \approx 2T_d + N_{TA,offset}T_c$, where $T_d$ is the propagation delay between the wireless device 22 and its serving network node 16. That is, the timing for receiving CLI-SRS, is the same as the wireless device 22's own uplink transmission timing.

Method 3: The timing offset is fixed to $\Delta_T \approx 2T + N_{TA,offset}T_c$, where $T=d/c$, and d is the cell radius and c is the speed of light.

Method 4: The timing offset is fixed to $\Delta_T = T_d + N_{TA,offset}T_c$, where $T_d$ is the propagation delay between the wireless device 22 and its serving network node 16.

Method 5: The timing offset is deployment dependent. For example, it is based at least in part on one of the above Methods, depending on one or more of the CLI scenarios, cell sizes, etc., among other network characteristics.

Method 6: The timing offset is the sum of a fixed and a configurable part, $\Delta_T = \Delta_T^{Conf} + N_{TA,offset}T_c$ where $\Delta_T^{Conf}$ is configured for the wireless device 22 by the network node 16.

Timing Offset Determination

Figure 5:
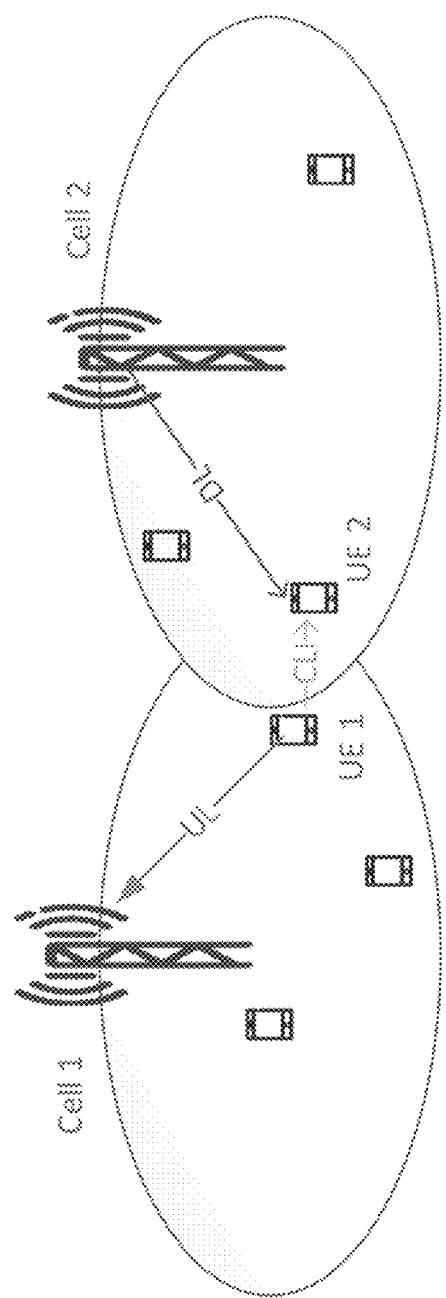
FIG. 5 is an example of a homogenous wireless device to wireless device CLI scenario.

Referring back to the example shown in FIG. 5, the WD-to-WD CLI measurement is performed at UE 2 (which may also be referred to as WD 22b herein in which WD 22b has been modified as may be needed to perform the functions described above with respect to a WD22). For UE 1 (which may also be referred to as WD 22a herein in which WD 22b has been modified as may be needed to perform the functions described above with respect to a WD22), by applying the timing advance $T_{TA} \approx 2T_d^{(1)} + N_{TA,offset}T_c$, its UL transmission timing has a time offset $T_d^{(1)} - T_{TA} \approx -T_d^{(1)} - N_{TA,offset}T_c$ relative to its serving network nodes 16's DL transmission timing, where $T_d^{(1)}$ is the propagation delay between UE 1 and its serving network node 16. Then, the UL data transmitted from UE 1 may thus be received at its serving network node 16 with a timing offset $-T_d^{(1)} - N_{TA,offset}T_c + T_d^{(1)} = -N_{TA,offset}T_c$ relative to its serving network node's DL transmission timing, where $N_{TA,offset}T_c$ is the fixed offset between the UL reception timing and the DL transmission timing at a network node, and it is used to account for TX/RX switching processing time.

Figure 14:
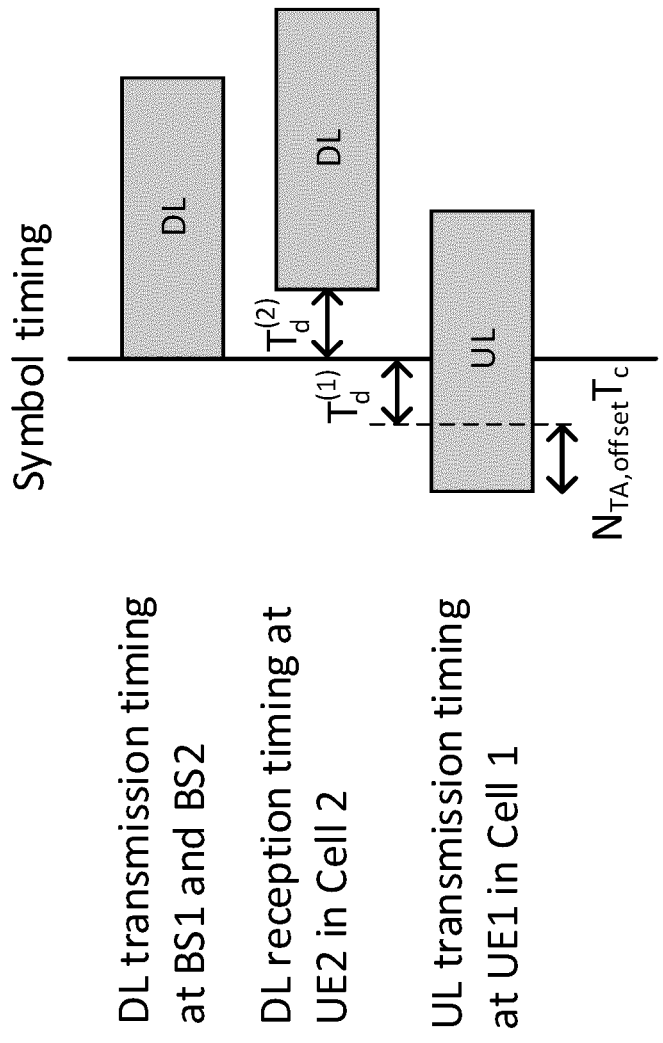
FIG. 14 is a diagram of transmission and reception timing for network nodes and wireless devices.

If the CLI-SRS is transmitted by UE 1 with this $T_{TA}$, and assuming that the DL transmission timing is aligned at Cell 1 and Cell 2, the CLI-SRS transmitted from UE 1 may be received by UE 2 with a timing offset $\Delta_T = T_d^{(2)} + T_d^{(1)} + N_{TA,offset}T_c - T_d^{(3)}$ relative to UE 2's downlink reception timing, where $T_d^{(2)}$ is the propagation delay between UE 2 and its serving network node 16 and $T_d^{(3)}$ is the propagation delay between UE 1 and UE 2. This is illustrated in FIG. 14.

This timing offset $\Delta_T = T_d^{(2)} + T_d^{(1)} + N_{TA,offset}T_c - T_d^{(3)}$ is the one that may need to be defined to enable the accuracy of the SRS-RSRP based CLI measurements.

In some embodiments the timing offset is further based on at least one or more of: the propagation delay between the wireless device (WD 22b) and another wireless device (WD 22a); the propagation delay between the wireless device (WD22b) and the network node (16, 16a); the propagation delay between the another wireless device (WD 22a) and the another network node (16, 16c); a fixed offset between uplink reception timing and downlink transmission timing at the network node (16, 16a); a fixed offset between uplink reception timing and downlink transmission timing at the another network node (16, 16c); a cell radius of the network node (16, 16a); and a timing advance.

Homogeneous Deployment Example

Referring back FIG. 5, FIG. 5 shows a homogenous deployment, where the cell sizes are similar. Consider a worst-case CLI scenario, where the aggressor and victim wireless device (UE1 and UE2) are at roughly the same place, on the edge of their serving cells, so that $T_d^{(3)} \approx 0$. Since cell 1 and cell 2 have the similar cell sizes, thus, similar propagation delays $T=T_d^{(1)}=T_d^{(2)}$ can be assumed. Then, for the victim wireless device (UE 2), the timing offset between its CLI-SRS reception timing and its DL reception timing can be approximated by $\Delta_T=2T+N_{TA,offset}T_c$, and the value of $\Delta_T$ depends on the cell radius as $T=d/c$, where $d=d^{(1)}=d^{(2)}$ is the cell radius and c the speed of light. Since $T=T_d^{(1)}=T_d^{(2)}$, the timing offset can also be approximated by $\Delta_T=2T_d^{(2)}+N_{TA,offset}T_c$, where $2T_d^{(2)}+N_{TA,offset}T_c$ is the timing advance for UE 2 for its UL transmissions.

In one or more embodiments, the timing offset is fixed to $\Delta_T \approx 2T+N_{TA,offset}T_c$, where $T=d/c$, and d is the cell radius and c is the speed of light.

In one or more embodiments, the timing offset is fixed to $\Delta_T=N_{TA,offset}T_c$.

In one or more embodiments, the timing offset is fixed to its timing advance for its own uplink transmissions, i.e., $\Delta_T=T_{TA} \approx 2T_d^{\square}+N_{TA,offset}T_c$, where $T_d$ is the propagation delay between the wireless device and its serving network node.

In one or more embodiments, the timing offset for CLI-SRS reception includes a fixed and a configurable term, i.e., $\Delta_T=\Delta_T^{Fixed}+\Delta_T^{Conf}$. For instance, the fixed term of the timing offset may be equal to $\Delta_T^{Fixed}=N_{TA,offset}T_c$ while the configurable term may be configured by the network node 16 to the wireless device and selected from a pre-defined set of possible candidate values. By dividing the timing offset into a fixed and configurable part, the associated signaling overhead can be reduced.

Heterogeneous Deployment Example

Figure 15:
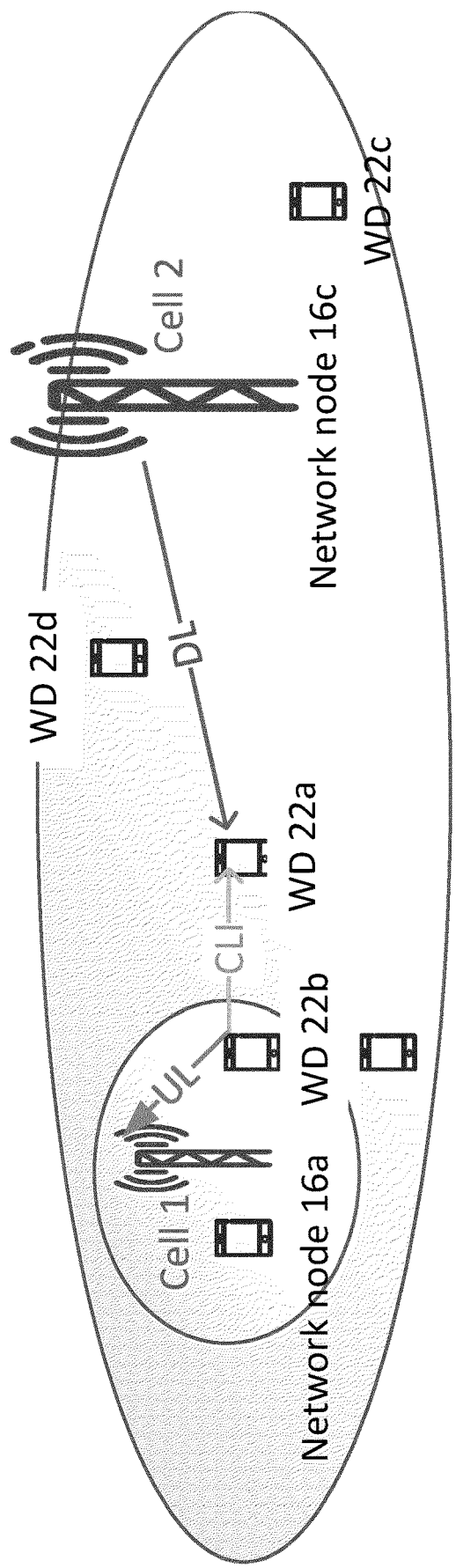
FIG. 15 is a diagram of an example of a heterogeneous wireless device to wireless device CLI scenario.

FIG. 15 shows a heterogeneous deployment, e.g., a macro-to-indoor scenario, where the cell sizes are different. In this scenario, the timing offset can also be approximated by $\Delta_T \approx 2T+N_{TA,offset}T_c$, different from the scenario shown in FIG. 5, where the value of $\Delta_T$ for this heterogeneous scenario depends on the average cell radius of the two interfering cells, i.e., $$T = d/c \text{ and } d = \frac{d^{(1)} + d^{(2)}}{2}.$$

Note that the approximation of $\Delta_T$ for the homogeneous scenario is a special case of the approximation of $\Delta_T$ for this heterogeneous scenario.

In the example shown in FIG. 15, the value of $\Delta_T$ is dominated by the propagation delay between wireless device 22a (i.e., UE 2) and its serving network node 16. Thus, it can be further approximated by $\Delta_T \approx T_d + N_{TA,offset}T_c$, where $T_d$ is the propagation delay between the wireless device and its serving network node 16. And wireless device 22a (UE2) can derive the value of $T_d$ from its uplink timing advance.

Therefore, in addition to the embodiments for the homogeneous deployment, a yet another embodiment may include:

In an embodiment, the timing offset is fixed to $\Delta_T=T_d^{\square}+N_{TA,offset}T_c$, where $T_d$ is the propagation delay between the wireless device 22 and its serving network node 16.

In another embodiment, the timing offset is fixed for a certain deployment or scenario, but different values of the timing offset are defined for different deployments/scenarios.

Therefore, the disclosure generally provide different methods to deal with the timing offset issue for the CLI-CLI measurements. In one or more embodiments, the wireless device applies a timing offset value relative to its own DL reception timing when performing SRS-RSRP measurements.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CLI | Cross-Link Interference |
| DCI | Downlink Control Information |
| DL | Downlink |
| FDD | Frequency Division Duplex |
| GP | Guard Period |
| NN | Network Node |
| PDCCH | Physical Downlink Control Channel |
| PDSCH | Physical Downlink Shared Channel |
| PRACH | Physical Random Access Channel |
| PUCCH | Physical Uplink Control Channel |
| PUSCH | Physical Uplink Shared Channel |
| RB | Resource Block |
| RRC | Radio Resource Control |
| SF | Subframe |
| SFI | Slot Format Indicator |
| TDD | Time Division Duplex |
| UE | User Equipment |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

Embodiments

Embodiment A1. A network node configured to communicate with a wireless device (WD), the network node configured to, and/or comprising a radio interface and/or comprising processing circuitry configured to:
communicate a timing advance to the wireless device; and
optionally receive, from the wireless device, an indication of at least one measurement performed based at least in part on the timing advance and a timing offset value of the wireless device relative to a downlink reception timing of the wireless device.

Embodiment A2. The network node of Embodiment A1, wherein the at least one measurement is a Sounding Reference Signal-Reference Signal Received Power, SRS-RSRP, based Cross-Link Interference, CLI, measurement.

Embodiment A3. The network node of Embodiment A1, wherein the timing offset value of the wireless device is based on at least one of:
a fixed offset between uplink reception timing and downlink transmission timing at the network node;
a propagation delay between the wireless device and the network node; and
a cell radius of the network node; and
a timing advance.

Embodiment B1. A method implemented in a network node, the method comprising:
communicating a timing advance to the wireless device; and
optionally receiving, from the wireless device, an indication of at least one measurement performed based at least in part on the timing advance and a timing offset value of the wireless device relative to a downlink reception timing of the wireless device.

Embodiment B2. The method of Embodiment B1, wherein the at least one measurement is a Sounding Reference Signal-Reference Signal Received Power, SRS-RSRP, based Cross-Link Interference, CLI, measurement.

Embodiment B3. The method of Embodiment B1, wherein the timing offset value of the wireless device is based on at least one of:
a fixed offset between uplink reception timing and downlink transmission timing at the network node;
a propagation delay between the wireless device and the network node; and
a cell radius of the network node; and
a timing advance.

Embodiment C1. A wireless device (WD) configured to communicate with a network node, the wireless device configured to implement a downlink reception timing, the WD configured to, and/or comprising a radio interface and/or processing circuitry configured to:
apply a timing offset value relative to the downlink reception timing when performing at least one measurement.

Embodiment C2. The WD of Embodiment C1, wherein the at least one measurement is a Sounding Reference Signal-Reference Signal Received Power, SRS-RSRP, based Cross-Link Interference, CLI, measurement.

Embodiment C3. The WD of Embodiment C1, wherein the timing offset value is based on at least one of:
   a fixed offset between uplink reception timing and downlink transmission timing at the network node;
   a propagation delay between the wireless device and the network node; and
   a cell radius of the network node; and
   a timing advance.

Embodiment D1. A method implemented in a wireless device (WD), the wireless device configured to implement a downlink reception timing, the method comprising applying a timing offset value relative to the downlink reception timing when performing at least one measurement.

Embodiment D2. The method of Embodiment D1, wherein the at least one measurement is a Sounding Reference Signal-Reference Signal Received Power, SRS-RSRP, based Cross-Link Interference, CLI, measurement.

Embodiment D3. The method of Embodiment D1, wherein the timing offset value is based on at least one of:
   a fixed offset between uplink reception timing and downlink transmission timing at the network node;
   a propagation delay between the wireless device and the network node; and
   a cell radius of the network node; and
   a timing advance.

The invention claimed is:

1. A network node configured to communicate with a wireless device in a cell, the network node comprising at least one of a radio interface and processing circuitry configured to:
   communicate a timing offset to the wireless device for adjusting the uplink transmission relative to the downlink reception in the cell, the timing offset being based on the timing offset used by another wireless device in another cell to adjust the timing of uplink transmission relative to the downlink reception timing, the cells being configured to operate using Time Division Duplex (TDD) configurations, the timing offset being based on at least one or more of:
   the propagation delay between the wireless device and the another wireless device;
   the propagation delay between the wireless device and the network node;
   the propagation delay between the another wireless device and the another network node;
   a fixed offset between uplink reception timing and downlink transmission timing at the network node;
   a fixed offset between uplink reception timing and downlink transmission timing at the another network node;
   a cell radius of the network node; and
   a timing advance.

2. The network node of claim 1, wherein the timing offset is applied to the uplink transmission relative to the downlink reception timing, in the cell, when performing at least one Cross-Link Interference (CLI) measurement at least one CLI measurement is based on one of a Sounding Reference Signal-Reference Signal Received Power (SRS-RSRP) measurement and a Received Signal Strength Indicator (RSSI) based measurement.

3. The network node of claim 2, wherein signal used for the CLI measurement is transmitted from the another wireless device.

4. The network node of claim 1, wherein wireless device is a victim wireless device and the another wireless device is an aggressor wireless device.

5. A method implemented in a network node the network node being connected to a wireless device in a cell, the cell experience cross-link interference from another cell comprising another network node and another wireless device configured to implement a downlink reception timing adjustment to the uplink transmission, the cells operating using Time Division Duplex (TDD) configurations, the method comprising:
   communicating a timing offset to the wireless device for adjusting the uplink transmission relative to the downlink reception in the cell, the timing offset being based on the timing offset used by the another wireless device in the another cell to adjust the timing of uplink transmission relative to the downlink reception timing, the timing offset being based on at least one or more of:
   the propagation delay between the wireless device and the another wireless device;
   the propagation delay between the wireless device and the network node;
   the propagation delay between the another wireless device and the another network node;
   a fixed offset between uplink reception timing and downlink transmission timing at the network node;
   a fixed offset between uplink reception timing and downlink transmission timing at the another network node;
   a cell radius of the network node; and
   a timing advance.

6. The method of claim 5, wherein the timing offset is applied to the uplink transmission relative to the downlink reception timing, in the cell, when performing at least one Cross-Link Interference (CLI) measurement at least one CLI measurement is based on one of a Sounding Reference Signal-Reference Signal Received Power (SRS-RSRP) measurement and a Received Signal Strength Indicator (RSSI) based measurement.

7. The method of claim 6, wherein signal used for the CLI measurement is transmitted from the another wireless device.

8. The method of claim 5, wherein wireless device is a victim wireless device and the another wireless device is an aggressor wireless device.

9. A wireless device configured to implement a timing adjustment to the uplink transmission relative to the downlink reception, the wireless device being connectable to a network node in a cell, the wireless device comprising at least one of a radio interface and processing circuitry configured to:
   receive a timing offset from the network node; and
   apply a timing offset value to the uplink transmission relative to the downlink reception timing, in the cell, when performing at least one Cross-Link Interference (CLI) measurement, the timing offset being based on the timing offset useable by another wireless device in another cell to adjust the timing of uplink transmission relative to the downlink reception timing, the cells being configured to operate using Time Division Duplex (TDD) configurations, the timing offset being based on at least one or more of:
   the propagation delay between the wireless device and the another wireless device;
   the propagation delay between the wireless device and the network node;
   the propagation delay between the another wireless device and the another network node;
   a fixed offset between uplink reception timing and downlink transmission timing at the network node;

a fixed offset between uplink reception timing and downlink transmission timing at the another network node;
a cell radius of the network node; and
a timing advance.

10. The wireless device of claim 9, wherein the at least one CLI measurement is based on one of a Sounding Reference Signal-Reference Signal Received Power (SRS-RSRP) measurement and a Received Signal Strength Indicator (RSSI) based measurement.

11. The wireless device of claim 10, wherein signal used for the CLI measurement is transmitted from the another wireless device.

12. The wireless device of claim 9, wherein wireless device is a victim wireless device and the another wireless device is an aggressor wireless device.

13. A method implemented in a wireless device, the wireless device configured to implement a timing adjustment to the uplink transmission relative to the downlink reception, the wireless device being connected to a network node in a cell, the cell experience cross-link interference from another cell comprising another network node and another wireless device configured to implement a downlink reception timing adjustment to the uplink transmission, the cells operating using Time Division Duplex (TDD) configurations, the method comprising:
receiving a timing offset value from the network node; and
applying a timing offset to the uplink transmission relative to the downlink reception timing, in the cell, when performing at least one Cross-Link Interference (CLI) measurement, the timing offset being based on the timing offset used by the another wireless device in the another cell to adjust the timing of uplink transmission relative to the downlink reception timing, the timing offset being based on at least one or more of:
the propagation delay between the wireless device and the another wireless device:
the propagation delay between the wireless device and the network node;
the propagation delay between the another wireless device and the another network node;
a fixed offset between uplink reception timing and downlink transmission timing at the network node;
a fixed offset between uplink reception timing and downlink transmission timing at the another network node;
a cell radius of the network node; and
a timing advance.

14. The method of claim 13, wherein the at least one CLI measurement is based one of a Sounding Reference Signal-Reference Signal Received Power (SRS-RSRP) measurement and on a Received Signal Strength Indicator (RSSI) based measurement.

15. The method of claim 14, wherein signal used for the CLI measurement is transmitted from the another wireless device.

16. The method of claim 13, wherein wireless device is a victim wireless device and the another wireless device is an aggressor wireless device.

* * * * *